Aug. 30, 1966 — M. C. ALEXINAS — 3,270,225
ROTOR STRUCTURE
Filed June 17, 1964

INVENTOR.
Michael C. Alexinas
BY
Albert H. Reuther
HIS ATTORNEY

United States Patent Office 3,270,225
Patented August 30, 1966

3,270,225
ROTOR STRUCTURE
Michael C. Alexinas, Dayton, Ohio, assignor to General Motors Corporation, Detroit, Mich., a corporation of Delaware
Filed June 17, 1964, Ser. No. 375,875
11 Claims. (Cl. 310—89)

This invention relates to dynamoelectric machine rotor structure, and, more particularly, to axial closure of vent or cooling passages therethrough.

Certain rotor structures are provided with vent or cooling passages extending substantially longitudinally through a magnetic core thereof. At times such vent or cooling passages are to be closed for differing dynamoelectric machine rotor installations though cast metal winding means with end rings thereon are usable both with and without vent or cooling passages. A problem is encountered in attempting to close off such vent or cooling passages while having such cast metal winding means with end rings and maintaining substantially balanced rotor conditions yet requiring only a minimum of parts for positive closure thereof.

An object of the present invention is to provide a new and improved dynamoelectric rotor structure for snap-fit of sealing ring means axially adjacent to passages therethrough.

Another object of the present invention is to provide a rotor structure having a squirrel cage winding portion carried by a magnetic core having annular end ring means with an inner peripheral surface that is subject to recessing in location to one side of the magnetic core through which passages extend, an annular washer member that fits concentrically inside the end ring means and over the passages of the magnetic core in sealing engagement therewith, and press fit retainer means to engage the end ring means along inner periphery thereof while simultaneously maintaining the washer member in sealing engagement with the magnetic core having the passages therethrough.

A further object of the present invention is to provide in combination on a dynamoelectric rotor structure having a magnetic core with passages therethrough in locations longitudinally of and radially inwardly from a squirrelcage metal winding portion having an end ring portion subject to recessing along inner periphery thereof, a flat washer member that fits concentrically inside the end ring means and over the ends of passages of the magnetic core in sealing engagement therewith, and press-fit retainer means to engage the end ring means peripherally with recessing thereof while simultaneously maintaining the flat washer member in sealing engagement with the magnetic core having the passages therethrough.

Another object of the present invention is to provide in combination on a dynamoelectric rotor structure having a magnetic core with passages therethrough in locations longitudinally of and radially inwardly from a squirrel cage aluminum metal winding portion having an aluminum end ring portion subject to recessing along inner periphery thereof, a flat annular metal washer member that fits concentrically inside the end ring means and over the ends of passages of the magnetic core in sealing engagement therewith, and press-fit retainer means of metal having an initial conic washer configuration flattened to engage the end ring means peripherally with recessing thereof while simultaneously maintaining the flat annular metal washer member in sealing engagement with the magnetic core having the passages therethrough.

Further objects and advantages will be apparent from the following description, reference being had to the accompanying drawings wherein a preferred embodiment of the present invention is clearly shown.

Figure 1:
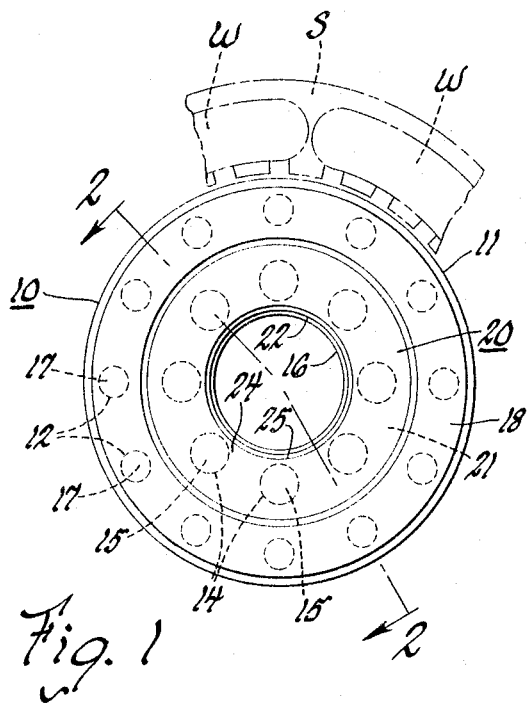
FIGURE 1 is an end view of a dynamoelectric machine rotor structure in accordance with the present invention.
Figure 2:
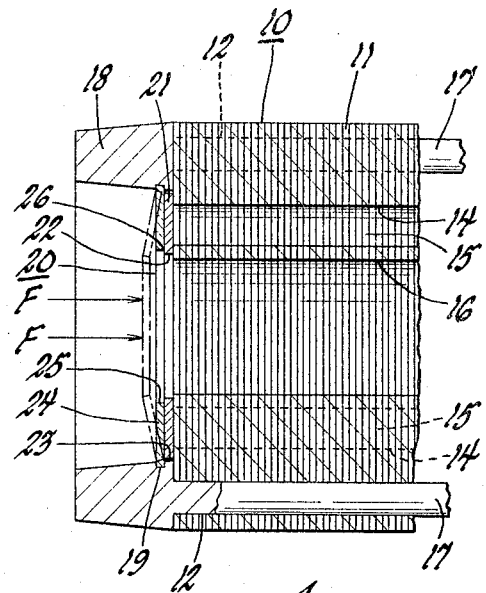
FIGURE 2 is a cross-sectional view taken along line 2—2 in FIGURE 1.
Figure 3:
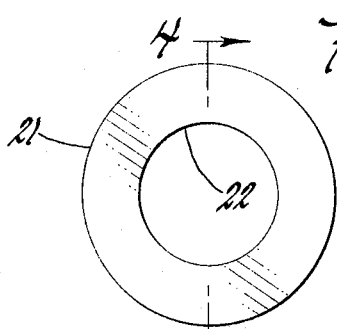
FIGURE 3 is a plan view of a washer member per se for use in structure of FIGURES 1-2.

Differing dynamoelectric machines having slotted stator means such as indicated by a designation S and having electrically energizable stator windings designated by W in FIGURE 1 can be provided with rotor structure generally indicated by numeral 10. This rotor structure generally includes a magnetic core formed by a stack of sheet metal laminations 11 each having a plurality of slots 12 alignable as to each other while simultaneously further openings 14 of each lamination in locations radially inwardly from the slots 12 collectively form vent or cooling passages 15 as indicated in views of FIGURES 1 and 2. Centrally a bore 16 is provided for mounting of the rotor structure on a shaft to be suitably journaled for rotation as to the wound stator means. The rotor structure 10 has a plurality of cast metal or aluminum conductor means 17 electrically shorted or joined to each other at opposite ends by a cast metal or aluminum end ring means 18 as represented in FIGURES 1 and 2. Along an inner periphery of this cast metal end ring means 18 there is a press-fit-formed undercut groove or recessing 19 located axially or longitudinally to one side of the magnetic core in a location radially intermediate the slots 12 and openings 14 for passages 15. This undercut groove or recessing 19 is purposely formed instantaneously and concentrically along an inner periphery of the cast metal end ring means or end ring portion 18 for use in closing such vent or cooling passages 15 on certain rotor structures which thus can be used with electrically energizable stator winding means with or without passages for venting, cooling and other purposes such as skewing.

In FIGURE 2 there can be seen in detail location of components used for such rotor structure to close passages axially thereof. In FIGURES 1 and 2 the components of such closure means are generally indicated by numeral 20 collectively. First, a flat washer or sealing member 21 is fitted concentrically inside the end ring portion 18. The flat washer or seal portion 21 has a central opening 22 of a diameter greater than that of the bore 16 though less than inner diameter of the openings 14 that forms the passages 15 for venting or cooling purposes on certain installations. The flat washer or sealing portion 21 fits axially in blocking relationship as to the passages 15 and grooving or recessing 19 located concentrically along the inner peripheral surfacing of the cast metal end ring means 18 now is instantaneously formed during press-fit flattening of an outer annular edging 23 of a conic washer member or conic press-fit retainer means 24 having a central opening 25 therethrough also of a diameter greater than that of the bore 16. The opening 25 has a diameter greater than that of the opening 22 of the washer or seal member 21 yet less than inner diameter dimensioning of the passages 15 formed by openings 14. Thus an inner edging 26 of the conic retainer means can engage a side of the seal or washer member 21 opposite to the side thereof engaged by the magnetic core. It is to be understood that the recessing could also be pre-cut, machined or otherwise formed along inner periphery of the end ring means though the instantaneous press-fit formation thereof is more inexpensive and advantageous. Also the inner diameter of the retainer means 24 can equal that of the washer or sealing member 21.

Figure 5:
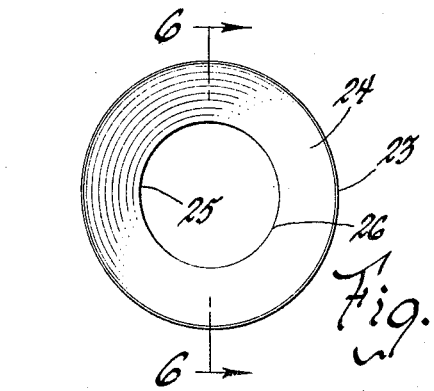
FIGURE 5 is a plan view of initially conic retainer means per se for use in structure of FIGURES 1-2.
Figure 6:
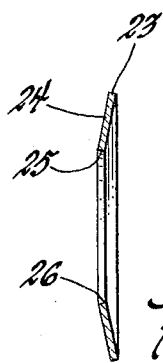
FIGURE 6 is a cross-sectional view taken along line 6—6 in FIGURE 5.
Figure 4:
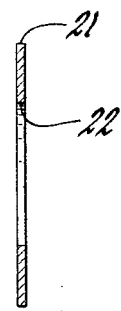
FIGURE 4 is a cross-sectional view taken along line 4—4 in FIGURE 3.

The conic washer member or retainer means 24 initially has an offset or dished configuration as best illustrated in FIGURE 6. The annular conic washer or retainer means 24 as shown in FIGURES 5 and 6 initially has an outer peripheral diameter for the outer edging 23 per se which is less than radially inner diameter of the recessing or grooving 19 resulting along inner periphery of the cast metal end ring means 18. Upon application of axial force represented by arrows F in FIGURE 2 initial conical configuration indicated in FIGURE 2 corresponding to that actually shown in FIGURE 6 is used to deform the conical configuration of the locking washer or retainer means 24 in a press or snap fit deformation whereby simultaneously the outer peripheral edging 23 interlocks with the press-fit-formed recessing or groove 19 of the end ring means and an inner peripheral edging 26 tightly engages the flat washer or sealing member 21 axially against the passages 15.

The use of only a pair of annular metal components such as the flat sealing washer member 21 and initially conical locking washer or retaining means 24 assures use of only a minimum number of parts though providing positive closure of the passages though maintaining substantially balanced rotor conditions since these components if provided in pairs at either of opposite ends of the magnetic core will not require any localized bolts or screws for fastening purposes in radially isolated locations. Thus the balance of rotor structure can be maintained and simultaneously positive sealing and closure of passages can be assured axially while the pair of members are locked radially into a predetermined positioning to one side thereof.

It is to be understood that features of the present invention can be applied not only for vent or cooling passage closure but also for closing off similarly located passages which can be provided for purposes of rotor lamination skewing as disclosed for example in a copending patent application S.N. 282,416, Herzog et al., filed May 22, 1963. Such skewing passages may also be left open for purposes of ventilation or cooling but also may be closed off to prevent entry of foreign materials, dirt and dust. Reference can be made to this copending application as to the specific details of such passages and purpose thereof so far as the skewing operation is concerned.

While the embodiment of the invention herein disclosed constitutes a preferred form, it is to be understood that other forms might be adopted.

What is claimed is as follows:

1. Dynamoelectric machine rotor structure, comprising, a slotted magnetic core having a central shaft bore and substantially longitudinal passages radially outwardly from said bore, a cast metal winding portion having conductor means extending substantially longitudinally of said slotted core and having end ring means joined therewith, end ring means possessing inwardly facing peripheries subject to inclusion of press-fit-formed recessing along an inner periphery thereof, a flat washer sealing member fitted against said magnetic core blocking said passages, and a retainer means having an outer edging intimately engaging said inwardly facing end ring peripheries and having an inner edging deformed against said sealing member.

2. The structure of claim 1 wherein said retainer means has an initially conical configuration with outer edging of a diameter initially less than that of said cast metal end ring means carried by said core, said outer edging having engagement with said cast metal end ring means due to axial displacement of said inner edging against said sealing member in final assembly.

3. The structure of claim 1 wherein both said sealing member and retainer means have central opening therethrough greater in diameter than that of the shaft bore of said magnetic core.

4. The structure of claim 1 wherein radially said washer sealing member has greater span than the passages yet outer diameter of said washer sealing member is less than inner diameter of said end ring means, said retainer means having inner edging diameter less than that of the passages though greater than that of said washer sealing member and having an outer edging diameter initially less than that of said cast metal end ring means, said retainer means due to axial displacement of assembly having increase of outer edging diameter which provides positive press interfit mating with said end ring means concentrically thereof.

5. In combination on a dynamoelectric machine rotor structure having both a squirrel-cage metal winding portion with recessed end ring means as well as a magnetic core with passages therethrough in locations longitudinally of and radially outwardly from a central shaft bore and radially inwardly from said squirrel-cage metal winding portion having end ring means recessed along inner periphery thereof, a flat washer sealing member fitted concentrically inside said end ring means and over the passages axially in sealing engagement therewith, and press-fit retainer means engaging the end ring means peripherally thereof while simultaneously maintaining the flat washer sealing member in sealing engagement with the magnetic core having the passages therethrough.

6. The combination of claim 5 wherein said flat washer seating member has a predetermined inner periphery and said squirrel cage metal-winding portion and end ring means are integrally cast of aluminum in location entirely radially outwardly from the passages, said retainer means having outer edging with a diameter intermediate that of said end ring means and passages which are covered axially by said washer sealing member, said retainer means having inner edging with a diameter greater than that of inner periphery of said washer sealing member yet less than that of the passages.

7. The combination of claim 5 wherein both said washer sealing member and said retainer means fit concentrically within inner periphery of said end ring means for maintaining balanced rotor conditions.

8. The combination of claim 5 wherein said retainer means has an initially conical configuration and inner edging thereof having snap-fit engagement of said end ring means axially against said core in assembled final positioning of said retainer means and sealing member radially adjacent to each other.

9. The combination of claim 5 wherein said retainer means has an initial conic configuration and is made of deformable metal that increases in outer diameter in change from conic to flat configuration radially in tight fit against inner periphery of said end ring means.

10. Dynamoelectric machine rotor structure, comprising, a slotted magnetic core having a central shaft bore as well as passages therethrough in a location radially outwardly from the bore, a cast metal winding portion having conductor means extending through said slotted core and having end ring means joined therewith which possess recessing along an inner periphery thereof, a flat washer sealing member fitted against said magnetic core in blocking position over the passages, and a retainer means having an outer edging in mating engagement with said recessing and having an inner edging deformed against said sealing member which closes off the passages.

11. In combination on a dynamoelectric machine rotor structure having a magnetic core with passages therethrough in locations radially outwardly from a central shaft bore and radially inwardly from a squirrel-cage metal winding portion having end ring means, a flat washer sealing member fitted concentrically inside said end ring means and over the passages axially in sealing engagement therewith, and press-fit retainer means engaging the end ring means peripherally thereof as well as maintaining the flat washer sealing member in sealing engagement with the magnetic core having the passages therethrough.

References Cited by the Examiner
UNITED STATES PATENTS

| | | | |
|---|---|---|---|
| 2,750,521 | 6/1956 | Wightman | 310—211 X |
| 3,163,789 | 12/1964 | Rosenberg | 310—53 |

MILTON O. HIRSHFIELD, *Primary Examiner.*

L. L. SMITH, *Assistant Examiner.*